United States Patent
Kim et al.

(10) Patent No.: US 9,253,781 B2
(45) Date of Patent: Feb. 2, 2016

(54) SCHEDULING IN CONSIDERATION OF TERMINAL GROUPS IN A MOBILE COMMUNICATION SYSTEM

(75) Inventors: Jihwan Kim, Daejeon (KR); Byounghoon Kim, Anyang-si (KR); Song Chong, Daejeon (KR); Jeonghoon Mo, Seoul (KR); Jaewon Lim, Anyang-si (KR); Jeongho Kwak, Daejeon (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 430 days.

(21) Appl. No.: 13/820,610

(22) PCT Filed: Mar. 11, 2011

(86) PCT No.: PCT/KR2011/001737
§ 371 (c)(1),
(2), (4) Date: Mar. 4, 2013

(87) PCT Pub. No.: WO2012/030037
PCT Pub. Date: Mar. 8, 2012

(65) Prior Publication Data
US 2013/0157678 A1  Jun. 20, 2013

Related U.S. Application Data

(60) Provisional application No. 61/379,392, filed on Sep. 2, 2010.

(51) Int. Cl.
*H04W 72/00* (2009.01)
*H04W 72/04* (2009.01)
*H04W 72/12* (2009.01)

(52) U.S. Cl.
CPC .......... *H04W 72/048* (2013.01); *H04W 72/121* (2013.01)

(58) Field of Classification Search
CPC .......................... H04W 72/048; H04W 72/121
See application file for complete search history.

(56) References Cited

U.S. PATENT DOCUMENTS

| | | | |
|---|---|---|---|
| 2005/0282550 A1 | 12/2005 | Cho et al. | |
| 2008/0069046 A1* | 3/2008 | Ishii et al. | 370/330 |
| 2008/0232320 A1 | 9/2008 | Lee et al. | |
| 2009/0170468 A1* | 7/2009 | Kane et al. | 455/404.2 |
| 2009/0291691 A1* | 11/2009 | Jeong et al. | 455/450 |
| 2011/0256884 A1* | 10/2011 | Kazmi | H04W 48/04 455/456.1 |

FOREIGN PATENT DOCUMENTS

KR 10-2005-0114589 A  12/2005
KR 10-2007-0021914 A  2/2007

* cited by examiner

*Primary Examiner* — Keith Fang
(74) *Attorney, Agent, or Firm* — Birch, Stewart, Kolasch & Birch, LLP

(57) ABSTRACT

Specifically, according to one embodiment of the present invention, a method for operating a base station that assigns frequency resources to terminals in a wireless communication system is provided. The method comprises the steps of calculating a first metric using information relating to the transmission rate of each terminal; calculating a second metric using information relating to a proportion of a group to which each of the terminals belongs; determining a terminal to which a frequency resource is assigned on the basis of the calculated first and second metrics; assigning the resource to the determined terminal; and updating the information relating to the transmission rate for each terminal and the information relating to proportion of a group.

18 Claims, 10 Drawing Sheets

FIG. 3
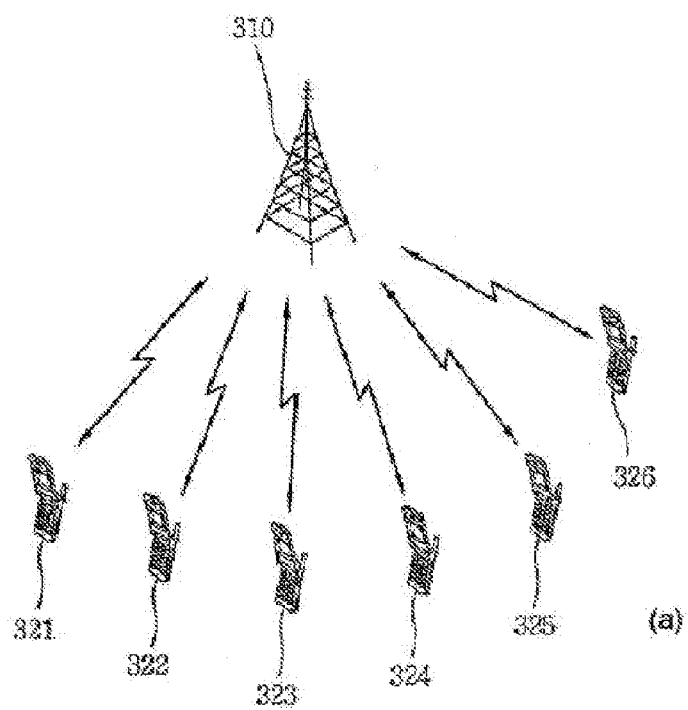
(a)
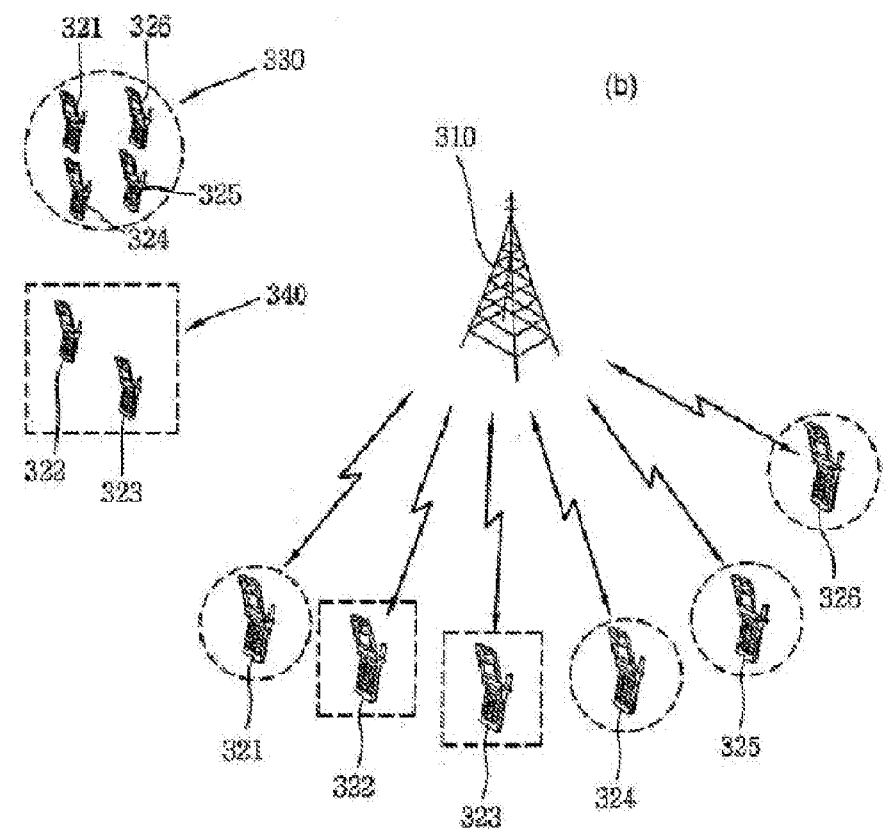
(b)

SCHEDULING IN CONSIDERATION OF TERMINAL GROUPS IN A MOBILE COMMUNICATION SYSTEM

CROSS REFERENCE TO RELATED APPLICATIONS

This application is the National Phase of PCT/KR2011/001737 filed on Mar. 11, 2011, which claims priority under 35 U.S.C. 119(e) to U.S. Provisional Application No. 61/379,392 filed on Sep. 2, 2010, all of which are hereby expressly incorporated by reference into the present application.

TECHNICAL FIELD

The present invention relates to mobile communication, and more particularly, to scheduling in consideration of a group to which a User Equipment (UE) belongs in a mobile communication system.

BACKGROUND ART

FIG. 1 illustrates a method for embedding a virtual network into a wired network.

In the wired network environment illustrated in FIG. 1, there is a physical substrate network 100. A server managing the substrate network models the substrate network using nodes and links between the nodes. Upon receipt of a virtual network request, the server embeds a virtual network having necessary node resources, link resources, and topology into the substrate network in an overlay manner in response to the virtual network request.

Since the virtual network configured in the wired network assumes that the physical network being the substrate network of the virtual network provides a certain node capacity and link capacity, the capacity of virtual nodes and virtual links requested by the virtual network request may be satisfied under an unvarying capacity constraint imposed by the substrate network.

Similarly to virtualization in the wired network environment, methods for providing a predetermined capacity to a specific UE in a wireless network have been proposed.

DISCLOSURE

Technical Problem

It is difficult to adapt an algorithm of configuring and managing a virtual network in a wired network to an environment having a wireless substrate network. To be more specific, the algorithm used for the virtual network configured in a wired substrate network cannot be still applied to a virtual network in the wireless substrate network in view of difficulty in representing radio resources in terms of capacity and the time-variant property of capacity.

If a substrate network in which a virtual network is to be configured is under a wireless communication environment, an Access Point (AP) or Base Station (BS) serving as a physical node may change capacity according to a UE receiving a service and according to a service providing time despite the same UE.

Taking into account the considerations set forth above, scheduling may be used as a radio resource allocation method for allowing a plurality of UEs to share radio resources in a wireless communication environment. However, conventional scheduling methods are limited in their effectiveness in dividing radio communication resources for respective UE groups and providing the divided radio communication resources to the UE groups in the wireless communication environment.

An object of the present invention devised to solve the conventional problem is to provide a method and apparatus for allocating radio resources hierarchically in a wireless communication system. To achieve the above object, the present invention provides scheduling by assigning weights to User Equipment (UE) groups regarding communication channels varying with UEs and time in a wireless communication environment.

Technical Solution

In an aspect of the present invention, a method for allocating frequency resources to UEs at a BS in a wireless communication system includes calculating first metrics using transmission rate information for each UE, calculating second metrics using proportion information for each group to which the each UE belongs, determining a UE to which frequency resources are to be allocated based on the calculated first and second metrics, allocating frequency resources to the determined UE, and updating the transmission rate information for the each UE and the proportion information for the each group.

The above one embodiment or other embodiments may include one or more of the following features.

The proportion information for the each group may include a reference proportion of the each group and a resource allocation proportion of the each group. The reference proportion of the each group may be calculated using a weight assigned to the each group calculated based on a time proportion which is set for the group. The resource allocation proportion of the each group may be calculated based on the reference ratio of the each group and whether the UE to which frequency resources are allocated belongs to a group. A UE having a highest sum of a first metric and a second metric may be selected as a UE to which frequency resources are to be allocated. The proportion information for the each group may be updated by decreasing second metrics for UEs of a group to which the frequency resource-allocated UE belongs. The resource allocation proportion of the each group may be calculated using the lowest and highest proportions of the each group, and the proportion information for the each group may be updated by decreasing the lowest proportion of the group to which the frequency resource-allocated UE belongs and increasing the highest proportion of the group to which the frequency resource-allocated UE belongs. The proportion information for the each group may be updated by increasing the lowest proportion of a group other than the group to which the frequency resource-allocated UE belongs and decreasing the highest proportion of the group other than the group to which the frequency resource-allocated UE belongs.

The first metrics may be alpha-Proportional Fairness ($\alpha$-PF) scheduling metrics based on an instantaneous transmission rate and average transmission rate of the each UE. The transmission rate information for the each UE may include an instantaneous transmission rate and average transmission rate of the each UE, and the calculation of first metrics may include receiving channel information for the each UE, calculating an instantaneous transmission rate of the UE based on the received channel information, and calculating the first metric of the UE based on the instantaneous transmission rate and average transmission rate of the UE and a fairness factor.

In another aspect of the present invention, a BS for allocating frequency resources to UEs in a wireless communication system includes a processor and a wireless communication module for transmitting and receiving wireless signals to and from the outside of the BS apparatus under control of the processor. The processor is configured to calculate first metrics using transmission rate information for each UE, calculate second metrics using proportion information for each group to which each UE belongs, determine a UE to which frequency resources are to be allocated based on the calculated first and second metrics, allocate resources to the determined UE, and update the transmission rate information for the each UE and the proportion information for the each group.

The above and other embodiments of the present invention may include one or more of the following features. The proportion information for the each group may include a reference proportion of the each group and a resource allocation proportion of the each group, the processor may calculate the resource allocation proportion of the each group based on the reference ratio of the group and whether the UE to which frequency resources are allocated belongs to a group, and the reference proportion of the group may be calculated using a weight assigned to the group calculated based on a time proportion which is set for the group. The processor may select a UE having a highest sum of a first metric and a second metric as a UE to which frequency resources are to be allocated and may update the proportion information for the each group by decreasing second metrics of UEs of a group to which the frequency resource-allocated UE belongs. The first metrics may be α-PF scheduling metrics based on an instantaneous transmission rate and average transmission rate of the each UE.

Advantageous Effects

According to an embodiment of the present invention, a BS can perform scheduling based on weights assigned to respective UE groups in a wireless communication system. The BS may perform groupwise scheduling in a wireless substrate network by allocating radio communication resources on a UE group-by-UE group basis.

According to an embodiment of the present invention, a virtual network can be efficiently deployed in a wireless communication system.

BRIEF DESCRIPTION OF THE DRAWINGS

FIG. 3 illustrates methods for scheduling a plurality of User Equipments (UEs) in the wireless communication environment;

BEST MODE FOR CARRYING OUT THE INVENTION

Figure 1:
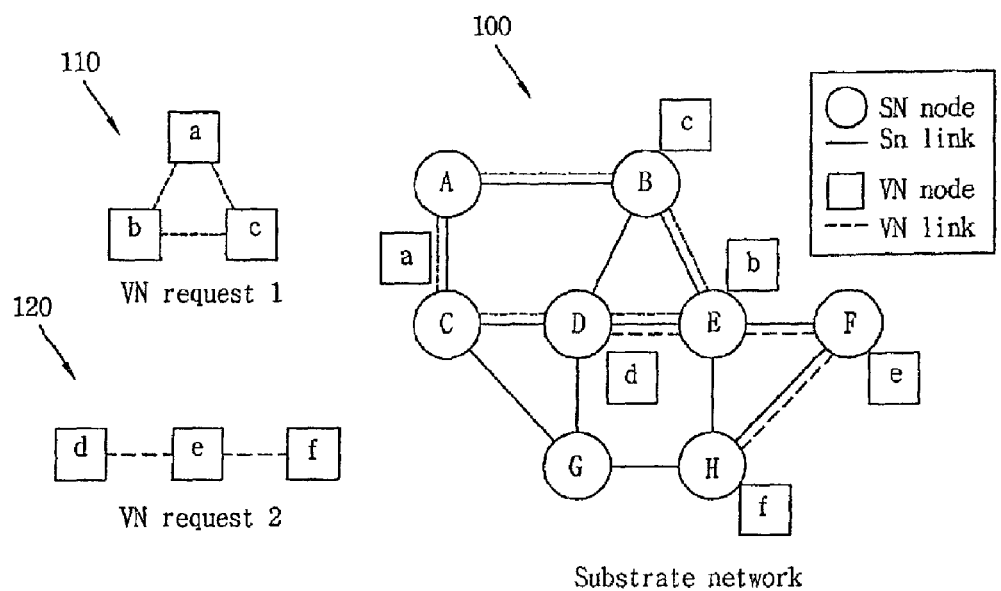
FIG. 1 illustrates a method for embedding a virtual network into a wired network.

The technical terms used in the present invention are provided simply to describe specific embodiments, not intended to restrict the present invention. Unless otherwise defined, all the technical terms used herein have the same meanings as terms generally understood by those skilled in the art. The terms should be interpreted as neither excessively comprehensive meanings nor excessively narrow meanings. If technical terms used in the specification are too wrongly chosen to accurately express the subject matter of the present invention, they should be replaced with ones readily understood to those skilled in the art. In addition, general terms used herein should be understood so as to have the same meanings as defined in a general dictionary or as contextual meanings of the related art. The terms should not be interpreted as excessively narrow meanings.

Herein, singular expressions include plural expressions unless otherwise clarified in the context. In this description, the term "include" or "have" is not interpreted as necessarily including all of the components or steps described in the specification. Rather, it should be understood that there are possibilities of omitting or adding one or more components or steps.

While ordinal numbers like first, second, etc. can be used to describe a number of components, these components are not limited by the terms. The terms are used only to distinguish one component from other components. For example, a first component may be referred to as a second component or vice versa within the scope and spirit of the present invention.

When it is said that one component is "connected" or "linked" to another component, they may be connected or linked directly or with a third component in between. On the other hand, if it is clarified that one component is "directly connected" or "directly linked" to another component, it should be understood that a third component is not interposed between the components.

Reference will now be made to preferred embodiments of the present invention with reference to the attached drawings. Like reference numerals denote the same or similar components and redundant descriptions of the components are avoided. A detailed description of known technologies will be omitted lest it should obscure the subject matter of the present invention. In addition, the attached drawings are provided to help easy understanding of the subject matter of the present invention, not limiting the present invention. The spirit of the present invention should be interpreted as expanding to all variations, equivalents, and replacements besides the attached drawings.

The term terminal may be replaced with User Equipment (UE), Mobile Equipment (ME), Mobile Station (MS), User Terminal (UT), Subscriber Station (SS), Mobile Subscriber Station (MSS), wireless device, handheld device, or Access Terminal (AT).

Figure 2:
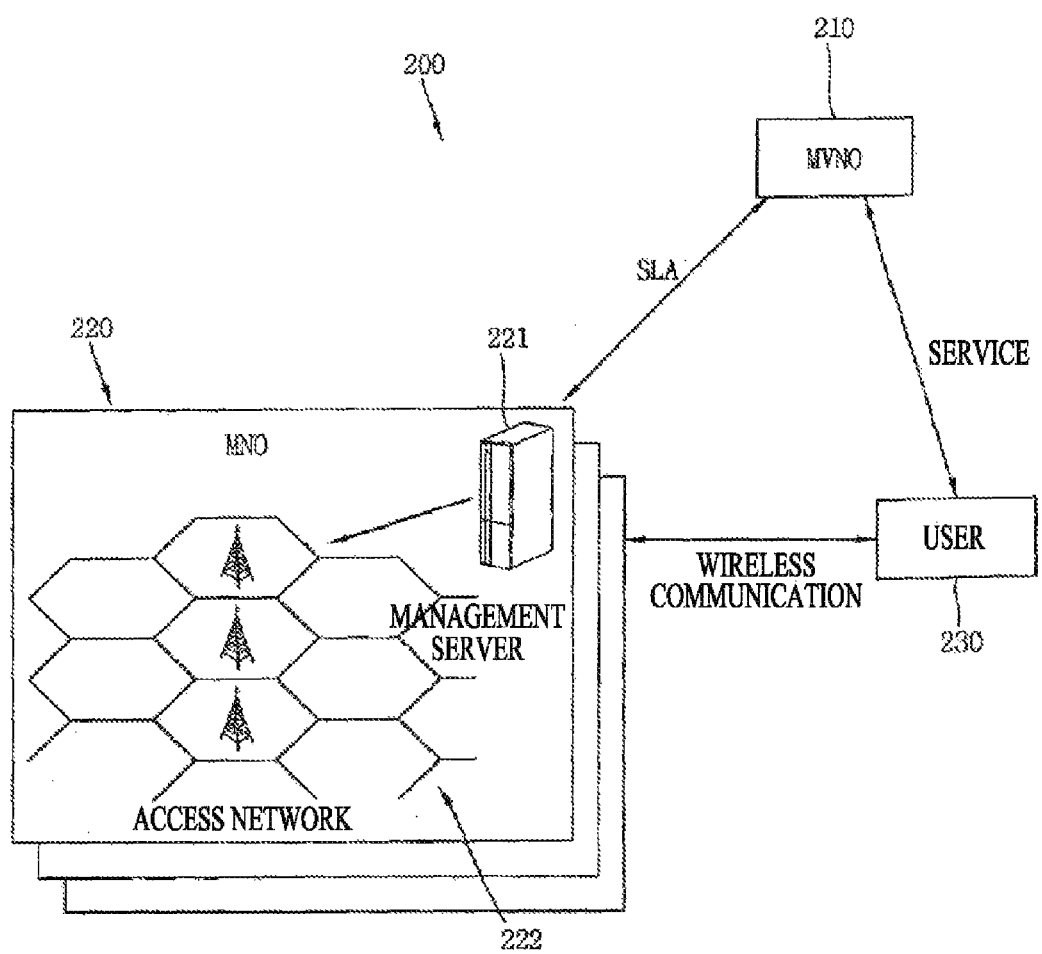
FIG. 2 illustrates an exemplary system to which virtualization is applied in a wireless communication environment.

FIG. 2 illustrates an exemplary system to which virtualization is applied in a wireless communication environment.

An exemplary system 200 to which a hierarchical resource allocation method set forth herein is applied includes a Mobile Virtual Network Operator (MVNO) 210 for providing various functions and services including VoIP, streaming service, content service, etc. to one or more User Equipments (UEs) 230. In general, the MVNO 210 is an entity or operator managed separately from hosting Mobile Network Operators (MNOs) 220. The MVNO 210 provides a data service using the infrastructures of one or more MNOs 220 without owning an infrastructure such as a Mobile Switching Center (MSC), a BS 221, an access network 222, etc. used in a mobile communication environment.

Nonetheless, there exists some MVNO 210 that has a Home Location Register (HLR) and thus can assign an ID to a UE 230 and provide a service to the UE 230. In this case, to provide a service in conformance to an agreement made with the UE 230, the MVNO 210 needs the MNOs 220 to guarantee an acceptable level of Quality of Service (QoS) by making an agreement such as a Service Level Agreement (SLA) with the MNOs 220.

Therefore, the MNOs 220 hosting the MVNO 210 should allocate resources in a manner that ensures QoS required by the SLA to the MVNO 210 on the infrastructures managed by the MNOs 220. For this purpose, the MNOs 220 should be able to allocate radio resources at a predetermined ratio to UEs that belong to the MVNO 210.

The wireless communication system to which the hierarchical resource allocation method described herein is applied may also be a system that needs to allocate radio resources hierarchically to the UEs of a group, such as a Wireless LAN or other systems using short-range wireless communication, not limited to the afore-described mobile communication environment or MVNO operation environment.

A description will be given of an operation for allocating frequency resources to UEs at a BS in a wireless communication system according to an embodiment of the present invention with reference to FIGS. 3 and 4.

FIG. 3 illustrates methods for scheduling a plurality of UEs in a wireless communication environment.

Referring to FIG. 3($a$), a BS 310 that communicates wirelessly with one or more UEs 321 to 326 within a cell of an access network performs scheduling so that the UEs 321 to 325 may share frequency resources.

In the wireless communication system according to the embodiment of the present invention, the BS 310 may use a first scheduling metric based on the transmission rate of each UE as a scheduling metric for determining a UE to which resources are to be allocated.

Increasing system throughput, efficiency of radio resource sharing, support of QoS requirements of different services, fairness between UEs, etc. are considered in determining a scheduling algorithm for the BS 310. An RR (Round-Robin) algorithm, a PF (Proportional Fairness) algorithm, etc. are available as scheduling algorithms for the BS 310.

The RR algorithm is the simplest of scheduling algorithms, which allocates frequency resources to UEs within a cell in circular order. Despite the advantage of fair allocation of radio resources between UEs within a cell, RR scheduling is not effective in terms of efficiency of radio resource sharing because it does not consider the channel state of each UE at all. Compared to the RR algorithm, the PF algorithm increases scheduling gain through balancing between transmission rate and fairness which are in the trade-off relationship.

Notably, the first scheduling metric is not limited to calculation only based on the transmission rate of each UE in the wireless communication system according to the embodiment of the present invention. Rather, the first scheduling metric may be a scheduling metric used in a general scheduling algorithm.

While it has been described that the scheduling algorithm is applied on a UE basis, the BS 310 may use an efficient scheduling algorithm on a UE group basis, to thereby increase the efficiency of radio resources. This scheduling will be described below with reference to FIGS. 3($b$) and 4.

Referring to FIG. 3($b$), the UEs 321 to 326 that communicate wirelessly with the BS 310 are divided into two groups: a first group 330 including the UEs 321, 324, 325 and 326 and a second group 340 including the UEs 322 and 323. Compared to the scheduling illustrated in FIG. 3($a$), the BS 310 may perform scheduling in consideration of the group of each UE.

In the wireless communication system according to the embodiment of the present invention, the BS 310 may use a second scheduling metric based on a weight assigned to each UE group as an additional scheduling metric for determining a UE to which radio resources are to be allocated.

The UE groups 330 and 340 may be distinguished by different QoS requirements. That is, the UE groups 330 and 340 may be distinguished by different QoS levels to be guaranteed according to the type of a contract made with an MNO (not shown) or according to an SLA made between an MNO (not shown) managing the BS 310 and an MVNO (not shown).

In the wireless communication system according to the embodiment of the present invention, weights are assigned to respective UE groups. A criterion for sharing radio resources between groups is the radio resource occupation times of the groups or the proportions of the radio resource occupation times of the groups. The weights of the groups are calculated based on time proportions assigned to the respective groups.

For example, if the same weight 0.5 is assigned to the first group 330 having four UEs and the second group 340 having two UEs, the four UEs of the first group 330 and the two UEs of the second group occupy the same time period.

This is a scheduling scheme of adding the layer of UE groups by extending scheduling of a plurality of UEs by dividing radio resources in time in a wireless access network. Accordingly, hierarchical scheduling is performed, taking into account of the groups of UEs, using the additional second scheduling metrics based on weights assigned to the respective groups as well as the first scheduling metrics based on the transmission rates of respective UEs in the wireless communication system according to the embodiment of the present invention.

One thing to note herein is that the BS 310 does not perform scheduling using the higher-layer second scheduling metrics only, in order to consider the groupwise resource allocation ratio, when allocating wireless communication resources according to the embodiment of the present invention. Instead, the BS 310 allocates radio resources using both the first scheduling metrics based on the transmission rate of each UE and the second scheduling metrics, thereby performing opportunistic resource allocation on the whole.

Figure 4:
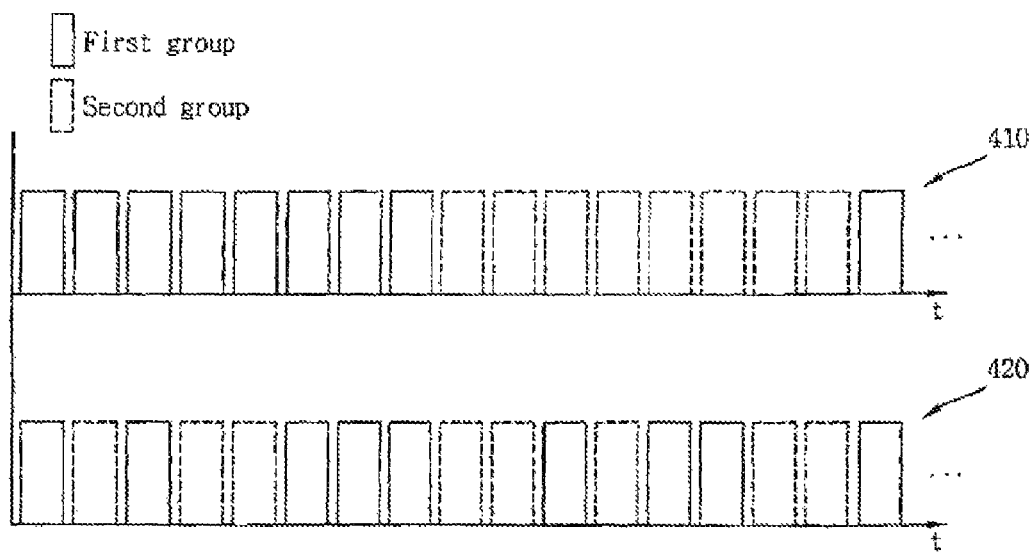
FIG. 4 illustrates a hierarchical resource allocation method in a wireless communication system according to an embodiment of the present invention.

FIG. 4 illustrates a hierarchical resource allocation method in the wireless communication system according to an embodiment of the present invention.

While a virtual network configured in a wired network as a substrate network uses capacity as a virtualization criterion, a group-layered virtual network of a wireless communication system uses radio resource occupation times as a virtualization criterion, taking into account transmission rates and group weights according to the embodiment of the present invention.

FIG. 4 illustrates the results of periodic resource allocation 410 and aperiodic resource allocation 420 as hierarchical radio resource allocation methods. In the periodic resource allocation 410, the channel states of the UEs in groups are not considered because resources are periodically allocated to first and second groups (indicated by solid lines and dotted lines, respectively). On the other hand, resources are allocated in an opportunistic manner to the first and second groups in the aperiodic resource allocation 420.

As described before, if the BS allocates resources, first considering the groups of UEs, that is, if scheduling considering the second scheduling metrics only is first performed, this scheduling scheme is similar to applying the RR algorithm on a group basis and periodic resource allocation based on a groupwise allocation ratio by the BS. In this case, the total scheduling efficiency of the cell may be reduced in the access network because the time-variant channel state of each UE in each group is not considered. In the hierarchical resource allocation method, therefore, when a long-term allocation ratio is monitored, it is necessary to perform scheduling, taking into account the time-variant channel states of the UEs, while the groupwise allocation ratio is followed on the average, like the aperiodic resource allocation 420.

For this purpose, an embodiment of the present invention provides an opportunistic resource allocation method considering layers using both the transmission rates of UEs and a groupwise allocation ratio in the wireless communication system. That is, the BS selects a UE to which radio resources are to be allocated using scheduling metrics obtained by combining the first scheduling metrics based on the transmission rates of the UEs and the second scheduling metrics based on the groupwise allocation ratio.

Figure 5:
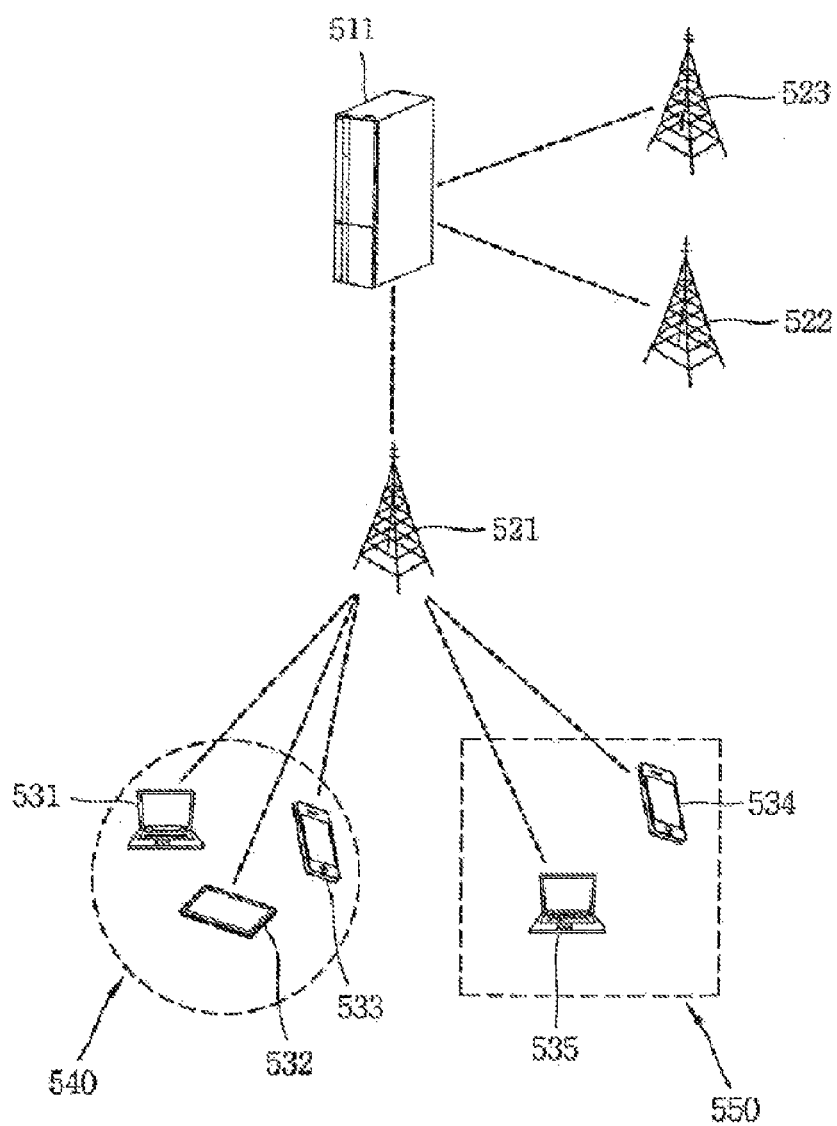
FIGS. 5 and 6 illustrate the configurations of wireless communication systems according to embodiments of the present invention.
Figure 6:
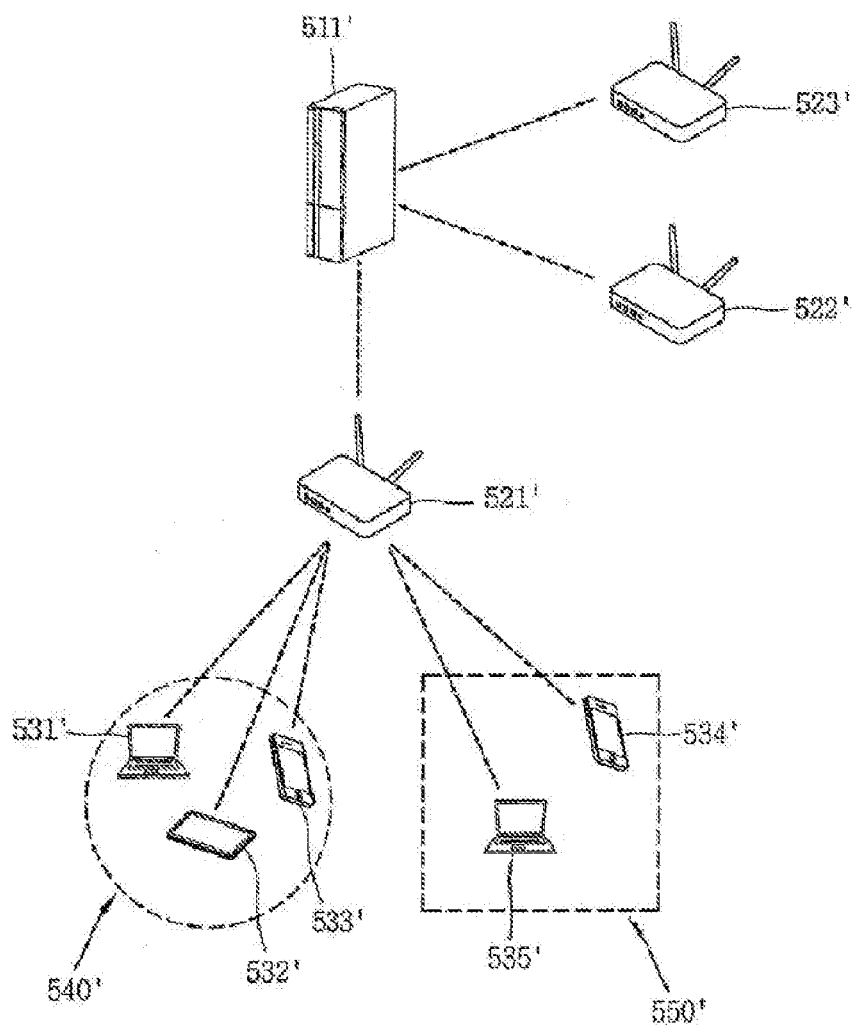

FIGS. 5 and 6 illustrate the configurations of wireless communication systems according to embodiments of the present invention.

Referring to FIG. 5, a wireless communication system includes BSs 521, 522 and 523 for communicating wirelessly with UEs 531 to 535 in a mobile communication environment and a management server 511 for managing the BSs 521, 522 and 523. For example, if a first group 540 includes the UEs 531, 532, and 533 and a second group 550 includes the UEs 534 and 535, the management server 511 may provide information about the first and second groups 540 and 550 to the BSs 521, 522 and 523, for virtualization.

As described before, the BS 521 performs hierarchical scheduling for the UEs 531 to 535 divided into the first and second groups 540 and 550, taking into account the allocation proportions of the respective groups 540 and 550 and the transmission rates of the respective UEs 531 to 535.

Referring to FIG. 6, similarly to the mobile communication environment illustrated in FIG. 5, a wireless communication system includes APs 521', 522' and 523' for communicating wirelessly with UEs 531' to 535' in a Wireless LAN environment and a management server 511' for performing management operations including providing information about groups 540' and 550' to which the UEs 531' to 535' belong, for virtualization. The embodiments of the present invention described herein can be implemented with modifications made by amendment and addition according to implementation technologies in the wireless communication environment. Therefore, the following description will be given with the appreciation that the mobile communication environment illustrated in FIG. 5 is used.

Figure 7:
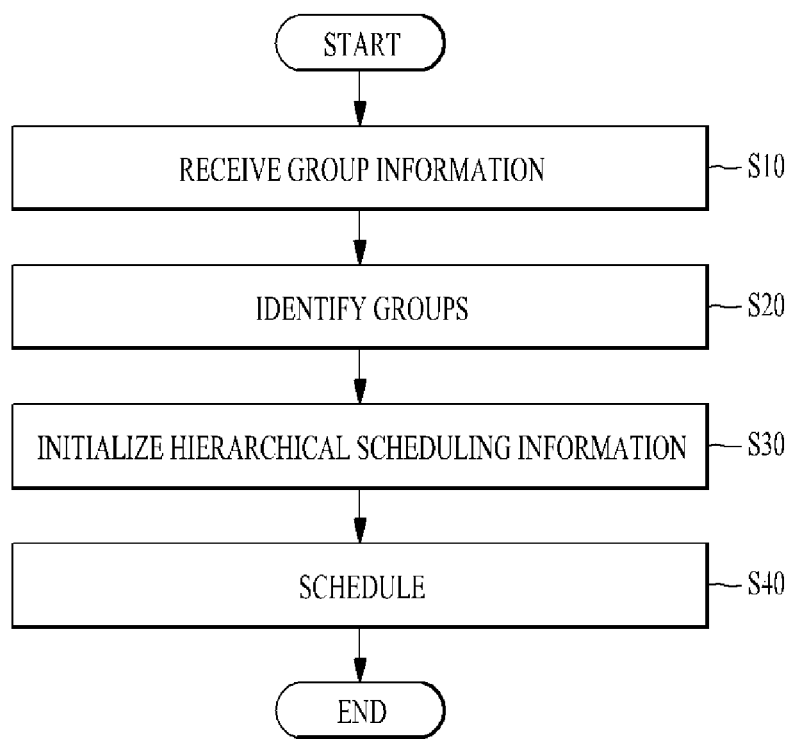
FIG. 7 is a flowchart illustrating a resource allocation method in the wireless communication system according to an embodiment of the present invention.

FIG. 7 is a flowchart illustrating a resource allocation method in the wireless communication system according to an embodiment of the present invention.

A BS first receives information required for hierarchical resource allocation from a management server (S10). The information required for hierarchical resource allocation may include information for dividing UEs into groups and weights $\omega_g$ assigned to the respective groups.

Then the BS identifies the groups of the UEs (S20). For example, when a UE initiates wireless communication with the BS, the UE transmits information about the group of the UE to the BS during authentication with the BS. Subsequently, the BS may identify the group of the UE based on the received group information about the UE and determine a group weight for the UE based on information received from the management server. The group weight may be used to set a resource allocation time proportion for the group, when the BS performs hierarchical scheduling over a long term.

The BS initializes hierarchical scheduling (S30) and repeats a scheduling procedure over time (S40).

The hierarchical scheduling of the BS is the process of iteratively determining a UE to which resources are to be allocated and allocating the radio resources to the determined UE. For this purpose, the BS sets initial values for an average transmission rate $R_s(t)$ and minimum and maximum proportions of each group, $q_g^{min}(t)$ and $q_g^{max}(t)$, thereby initializing the iterative scheduling procedure. The minimum and maximum proportions of each group are the lowest and highest values of a virtual queue used to adjust a groupwise time allocation ratio during scheduling. The specific meanings of the average transmission rate and the maximum and minimum proportions of each group will be described later along with a description of the scheduling procedure.

An iterative scheduling operation in the wireless communication system according to an embodiment of the present invention will be described below with reference to FIG. 8.

Figure 8:
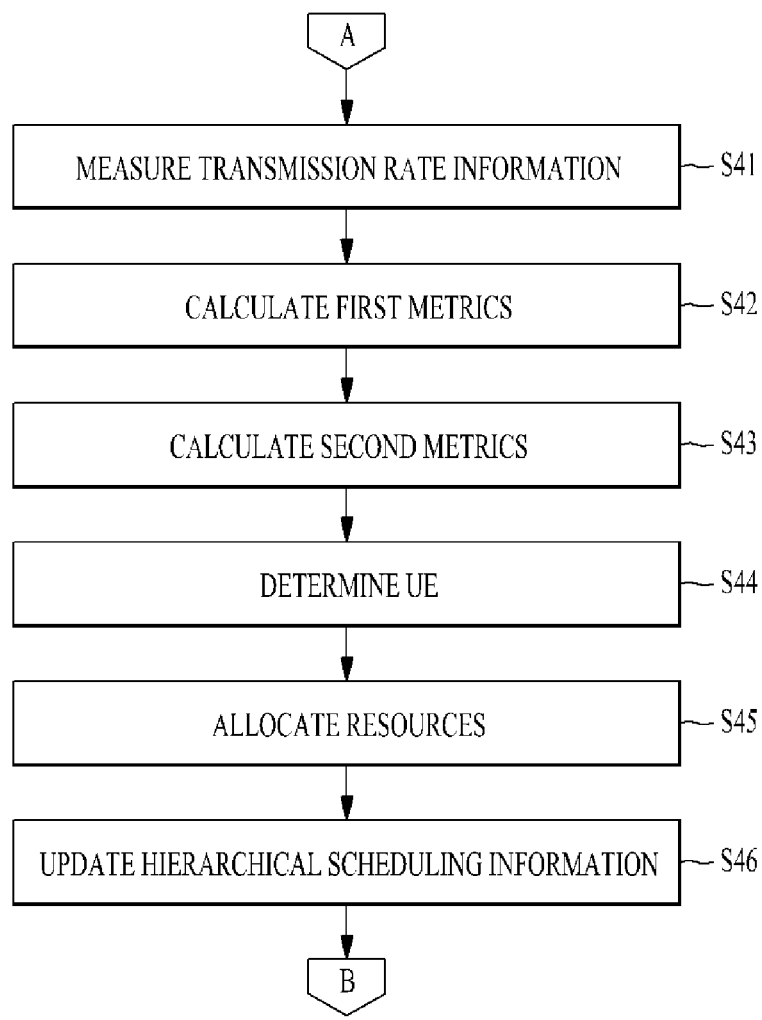
FIG. 8 is a flowchart illustrating an iterative hierarchical resource allocation method in the wireless communication system according to an embodiment of the present invention.

FIG. 8 is a flowchart illustrating an iterative hierarchical resource allocation method in the wireless communication system according to an embodiment of the present invention.

As described before, the BS allocates resources iteratively by combining first scheduling metrics based on the transmission rate of each UE and second scheduling metrics based on a groupwise allocation ratio. A first scheduling metric may be an α-PF scheduling metric based on the instantaneous transmission rate and average transmission rate of each UE. The following description is given in the context of the α-PF scheduling metric.

The BS measures transmission rate information about each UE, required for calculating a first scheduling metric (S41). The transmission rate information about each UE includes the instantaneous transmission rate $r_s(t)$ and average transmission rate $R_s(t)$ of the UE.

The BS measures the instantaneous transmission rates of all UEs to be serviced by the BS. The instantaneous transmission rate of each UE may be acquired from channel information fed back from the UE.

The average transmission rate $R_s(t)$ needed to calculate the first scheduling metric may be an initially set average transmission rate or an average transmission rate updated during iterative scheduling.

Then the BS calculates the first scheduling metric of each UE using the measured transmission rate information about the UE (S42).

The first scheduling metric SM1 may be calculated by [Equation 1]

$$SM1 = U'_s(R_s(t))r_s(t) \qquad \text{Equation 1}$$

Here, SM1 is the first scheduling metric (Scheduling Metric 1) and $U'_s(R_s(t))$ is a utility function of $R_s(t$, calculated by $$U'_s(R_s) = \begin{cases} \frac{R_s^{1-\alpha}}{1-\alpha} & \text{if } \alpha \neq 1 \\ \log(R_s) & \text{if } \alpha = 1 \end{cases}$$

where $\alpha$ is a fairness factor reflecting transmission rate and fairness.

Subsequently, the BS calculates a second scheduling metrics reflecting the resource allocation proportion of each group (S43). The second scheduling metric is calculated using a weight assigned to each group and the group weight is determined according to the proportion of a radio resource occupation time for the group, which is a criterion for sharing radio resources.

The resource allocation proportion of each group reflected in the second scheduling metric may be adjusted using a virtual queue defined by the lowest proportion $q_g^{min}(t)$ and highest proportion $q_g^{max}(t)$ of each group. Specific lowest and highest proportions of each group will be described later with reference to an update procedure.

The second scheduling metric may be calculated by [Equation 2].

$$SM2 = \beta(q_{g(s)}^{min}(t) - q_{q(s)}^{max}(t)) \qquad \text{Equation 2}$$

Here, SM2 is the second scheduling metric (Scheduling Metric 2) and $\beta$ is an update coefficient satisfying $0<\beta\ll1$, which is also used in updating an average transmission rate.

The BS determines a UE to which frequency resources are to be allocated based on the calculated first and second scheduling metrics (S44) and allocates resources to the determined UE (S45).

The BS may determine a UE having the highest sum of the first and second scheduling metrics as a UE to which frequency resources are to be allocated. How to determine a UE to which the BS is to allocate frequency resources may be expressed as [Equation 3].

$$s^*(t) = \arg\max_{s \in S}(SM1 + SM2) \qquad \text{Equation 3}$$
$$= \arg\max_{s \in S}(U'_s(R_s(t))r_s(t) + \beta(q_{g(s)}^{min}(t) - q_{g(s)}^{max}(t)))$$

Here, SM1 denotes the first scheduling metric, SM2 denotes the second scheduling metric, and $S^*(t)$ denotes the UE to which resources are allocated.

The BS updates information about the transmission rate of each UE and information about the allocation proportion of each group (S46).

Among information updated in the update procedure, information about the transmission rate of each UE that affects the first scheduling metric will be described. Information about the transmission rate of each UE is an average transmission rate and the average transmission rate is updated using a measured instantaneous transmission rate. That is, the average transmission rate of each UE reflects a cumulative value of instantaneous transmission rates of the UE.

The updated average transmission rate of each UE may be given as [Equation 4]

$$R_s(t+1) = \begin{cases} (1-\beta)R_s(t) + \beta r_{s(t)} & \text{if } s = s^*(t) \\ (1-\beta)R_s(t) & \text{if } s \neq s^*(t) \end{cases} \text{ for } \forall s \in S \qquad \text{Equation 4}$$

Here, $R_s(t+1)$ is the updated average transmission rate of each UE, $R_s(t)$ is an instantaneous transmission rate of the UE, $\beta$ is the update coefficient satisfying $0<\beta\ll1$, and $S^*(t)$ is the UE to which resources have been allocated.

Specifically, as scheduling is repeated, the BS decreases the average transmission rate. The decrement is the product between the current average transmission rate of the UE and the update coefficient. However, for a UE selected for frequency resource allocation in the previous steps S44 and S45, an increment calculated by multiplying the instantaneous transmission rate of the UE by the update coefficient is added to the average transmission rate of the UE. As a result, the average transmission rate of the UE to which radio resources have been allocated in the previous steps S44 and S45 is increased relative to those of other UEs and thus the first scheduling metric of the UE is decreased compared to those of the other UEs during next scheduling. Therefore, the UE has a lower resource allocation probability.

Now a description will be given of information about the groupwise allocation ratio that affects the second scheduling metric among the information updated in the update procedure. The BS performs scheduling based on the first and second scheduling metrics and manages the virtual queue in such a manner that a specific group does not have too small an occupation time or too large an occupation time with respect to a reference proportion for each group $\theta^*_g$ as a result of the scheduling. The virtual queue is managed appropriately by updating the lowest and highest proportions of each group $q_q^{min}(t)$ and $q_q^{max}(t)$.

The BS performs the update procedure so that the lowest proportion $Q_g^{min}(t)$ of the group to which the scheduled UE belongs may be decreased and the highest proportion $q_g^{max}(t)$ of the group may be increased. In addition, the BS performs the update procedure so that the lowest proportions $q_g^{min}(t)$ of the other groups may be increased and the highest proportions $q_g^{max}(t)$ of the other groups may be decreased.

In the update procedure of updating information about the groupwise allocation ratio, the lowest proportion of a specific group is increased or its highest proportion is decreased. Consequently, the second scheduling metric of the group gets smaller and thus the probability that a UE within the group will be selected during next scheduling is decreased. On the contrary, the lowest proportion of a specific group is decreased or its highest proportion is increased. Consequently, the second scheduling metric of the group gets larger and thus the probability that a UE within the group will be selected during next scheduling is increased. For example, the reference proportion of each group $\theta^*_g$ is the ratio of the weight of the group to the total sum of the weights of the groups $w_g$, expressed as [Equation 5].

$$\theta^*_g = w_g / \Sigma_{g \in G} w_g \qquad \text{Equation 5}$$

The reference proportion of each group $\theta^*_g$ is a criterion for updating the information about the allocation proportion of the group, that is, the lowest and highest proportions of the group $q_g^{min}(t)$ and $q_g^{max}(t)$. The lowest and highest proportions of each group may be given as [Equation 6] and [Equation 7], respectively.

$$q_g^{min}(t+1) = \begin{cases} [q_g^{min}(t) - 1]^+ + \theta^*_g & \text{if } g = g(s^*(t)) \\ q_g^{min}(t) + \theta^*_g & \text{if } g \neq g(s^*(t)) \end{cases} \text{ for } \forall g \in G \qquad \text{Equation 6}$$

-continued $$q_g^{max}(t+1) = \begin{cases} [q_g^{max}(t) - \theta_g^*]^+ + 1 & \text{if } g = g(s^*(t)) \\ [q_g^{max}(t) - \theta_g^*]^+ & \text{if } g \neq g(s^*(t)) \end{cases} \text{ for } \forall g \in G$$

Equation 7

Here, $q_g^{min}(t)$ and $q_g^{min}(t+1)$ denote the pre-update and post-update lowest proportions of the group, respectively and $q_s^{max}(t)$ and $q_g^{max}(t+1)$ denote the pre-update and post-update highest proportions of the group, respectively.

In the above-described procedures, the BS updates information about the allocation proportion of each group using the reference proportion of the group $\theta_g^*$ so that the proportion of a time during which radio resources are allocated to each group may get identical to the time proportion of radio resource allocation for the group received from the server over long-term iterative scheduling. That is, the BS decreases the lowest proportion of the group to which the radio resource-allocated UE belongs and increases the highest proportion of the group using the reference proportion of the group, while the BS increases the lowest proportions of the other groups and decreases the highest proportions of the other groups.

The BS performs the scheduling steps S41 to S45 using the updated information about the transmission rate of each UE and the updated information about the allocation proportion of each group in the update step S46.

Figure 9:
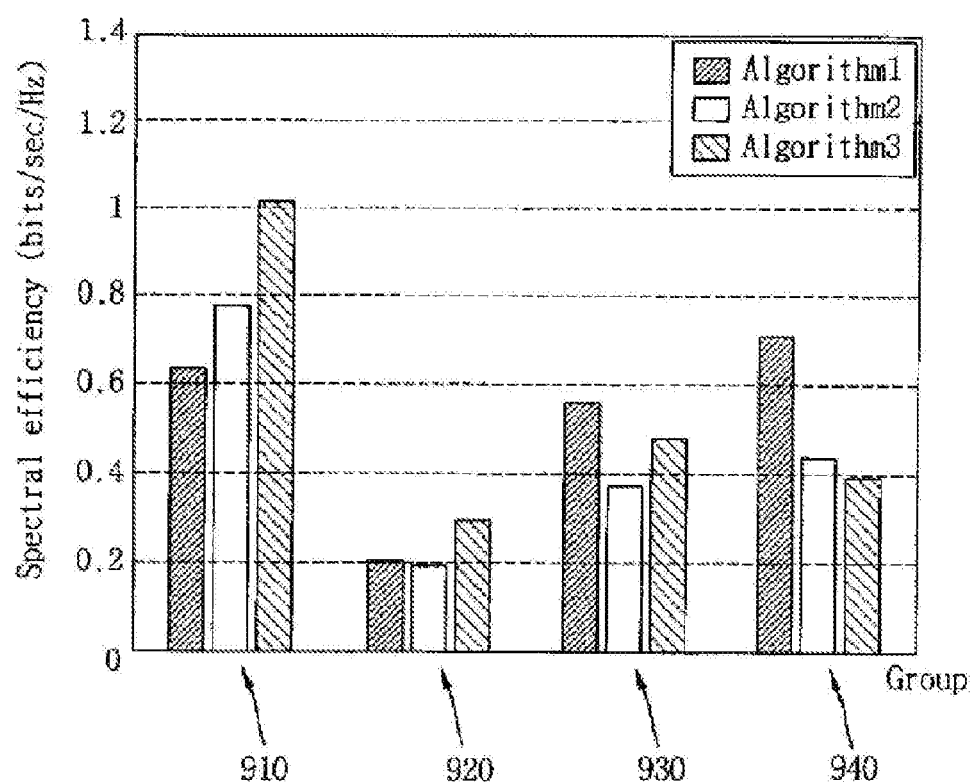
FIGS. 9 and 10 are graphs illustrating efficiency and time sharing proportions of groups in the resource allocation method in the wireless communication system according to the embodiment of the present invention.
Figure 10:
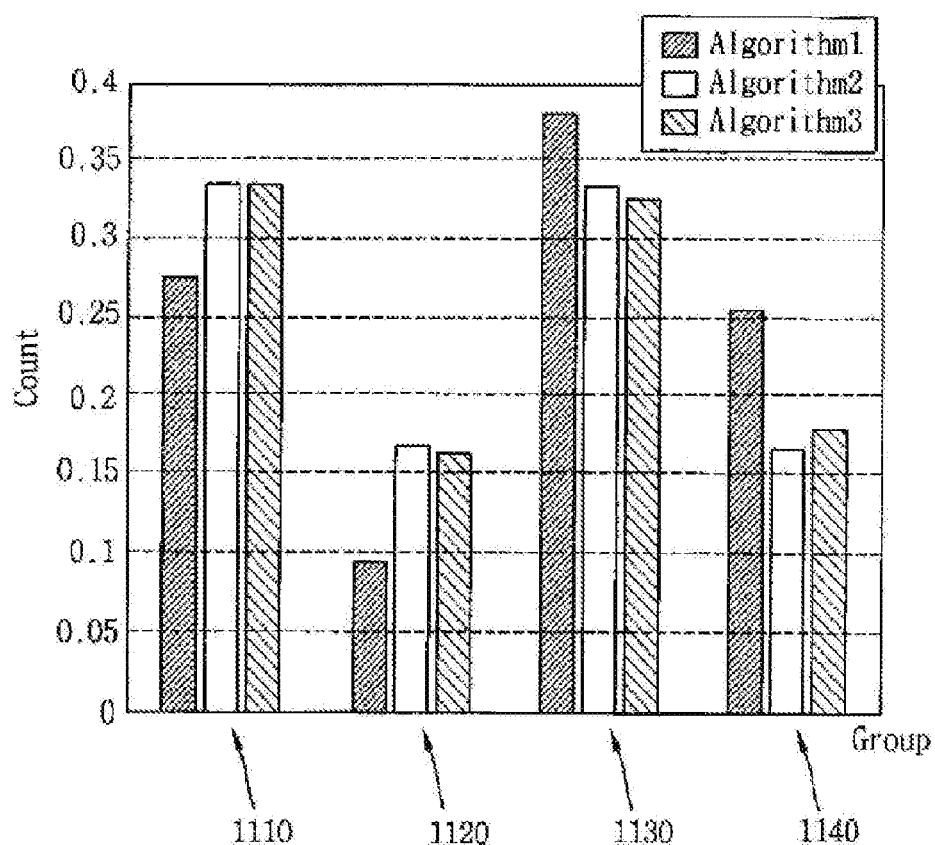

With reference to FIGS. 9 and 10, efficiency of the hierarchical resource allocation method will be described using the simulation results of the hierarchical resource allocation method. FIGS. 9 and 10 are graphs illustrating efficiency and time sharing proportions between groups in the resource allocation method in the wireless communication system according to the embodiment of the present invention.

In FIGS. 9 and 10, the simulation was performed in the wireless communication system under the condition that a BS allocates radio resources hierarchically to a total of 30 UEs divided into four groups (first to fourth groups) including 5, 5, 10, and 10 UEs, respectively and weights 2, 1, 2 and 1 are assigned to the respective groups. The simulation results of the respective groups are indicated according to group indexes: the first group (910, 1110), the second group (920, 1120), the third group (930, 1130), and the fourth group (940, 1140).

The simulation was performed using three hierarchical resource allocation algorithms. The algorithms are a PF algorithm (Algorithm 1), a PF+RR algorithm (Algorithm 2), and a PF+Opp algorithm (Algorithm 3). The PF algorithm considers only the transmission rate of each UE without hierarchical resource allocation considering the groups of UEs and thus may be used for the purpose of comparison with the other algorithms. The PF+RR algorithm applies the RR algorithm between UE groups and the PF algorithm for each UE of each group. The PF+Opp algorithm performs opportunistic resource allocation between UE groups and applies the PF algorithm to the UEs of each group.

Referring to FIG. 9, among the hierarchical resource allocation methods, Algorithm 3 is highly efficient on the whole, compared to Algorithm 2 because the former uses time-variant channel characteristics adaptively in resource allocation between groups.

When Algorithm 1 that does not consider groups as a layer is used for the third and fourth groups 930 and 940, higher efficiency is achieved. However, a groupwise allocation ratio of 2:1:2:1 is followed in hierarchical resource allocations of Algorithm 2 and Algorithm 3, not in Algorithm 1. Therefore, when hierarchical resource allocation is needed, for example, for virtualization in a wireless communication environment, Algorithm 3 is appropriate in view of consideration of a groupwise time allocation ratio and high efficiency for each UE.

While the present invention has been described referring to the preferred embodiments of the present invention, those skilled in the art will appreciate that the specific embodiments of the present invention are purely exemplary and do not limit the technical scope of the present invention. Thus, many modifications and changes can be made to the present invention without departing from the spirit and essential characteristics of the present invention.

The invention claimed is:

1. A method for allocating frequency resources to User Equipments (UEs) at a Base Station (BS) in a wireless communication system, the method comprising:
    calculating first metrics using transmission rate information for each UE;
    calculating second metrics using proportion information for each group to which the each UE belongs;
    determining a UE to which frequency resources are to be allocated based on the calculated first and second metrics;
    allocating frequency resources to the determined UE; and
    updating the transmission rate information for the each UE and the proportion information for the each group,
    wherein the proportion information for the each group includes a reference proportion of the each group and a resource allocation proportion of the each group, and
    the resource allocation proportion of the each group is calculated based on the reference ratio of the each group and whether the UE to which frequency resources are allocated belongs to a group.

2. The method according to claim 1, wherein the reference proportion of each group is calculated using a weight assigned to the each group calculated based on a time proportion which is set for the each group.

3. The method according to claim 1, wherein the determining the UE to which frequency resources are to be allocated comprises selecting a UE having a highest sum of a first metric and a second metric.

4. The method according to claim 3, wherein the updating of the proportion information for the each group comprises updating the proportion information for the each group by decreasing second metrics of UEs of a group to which the frequency resource-allocated UE belongs.

5. The method according to claim 4, wherein the resource allocation proportion of the each group is calculated using the lowest and highest proportions of the each group, and
    wherein the updating of the proportion information for the each group comprises updating the proportion information for the each group by decreasing the lowest proportion of the group to which the frequency resource-allocated UE belongs and increasing the highest proportion of the group to which the frequency resource-allocated UE belongs.

6. The method according to claim 5, wherein the updating the proportion information for the each group comprises updating the proportion information for the each group by increasing the lowest proportion of a group other than the group to which the frequency resource-allocated UE belongs and decreasing the highest proportion of the group other than the group to which the frequency resource-allocated UE belongs.

7. The method according to claim 6, wherein the updated lowest proportion of the each group is calculated by Equation 1 and the updated highest proportion of the each group is calculated by Equation 2, $$q_g^{min}(t+1) =$$  [Equation 1]

$$\begin{cases} [q_g^{min}(t) - 1]^+ + \theta_g^* & \text{if } g = g(s^*(t)) \\ q_g^{min}(t) + \theta_g^* & \text{if } g \neq g(s^*(t)) \end{cases} \text{ for } \forall g \in G$$

where $q_g^{min}(t+1)$ is the updated lowest proportion of the each group, $q_g^{min}(t)$ is the lowest proportion of the each group before the updating, $\theta_g^*$ is the reference proportion of the each group, calculated by $\theta_g^* = w_g / \Sigma_{g \in G} w_g$ where $w_g$ is the weight of the each group and $s^*(t)$ is the frequency resource-allocated UE, and $$q_g^{max}(t+1) =$$  [Equation 2]

$$\begin{cases} [q_g^{max}(t) - \theta_g^*]^+ + 1 & \text{if } g = g(s^*(t)) \\ [q_g^{max}(t) - \theta_g^*]^+ & \text{if } g \neq g(s^*(t)) \end{cases} \text{ for } \forall g \in G$$

where $q_g^{max}(t+1)$ is the updated highest proportion of the each group and $q_g^{max}(t)$ is the highest proportion of the each group before the updating.

8. The method according to claim 7, wherein the calculated second metrics are expressed as Equation 3, $$SM2 = \beta(q_{g(s)}^{min}(t) - q_{g(s)}^{max}(t))$$  [Equation 3]

where SM2 is the second scheduling metrics (Scheduling Metric 2) and $\beta$ is an update coefficient.

9. The method according to claim 1, wherein the first metrics are alpha-Proportional Fairness ($\alpha$-PF) scheduling metrics based on an instantaneous transmission rate and average transmission rate of the each UE.

10. The method according to claim 1, wherein the transmission rate information for the each UE includes an instantaneous transmission rate and average transmission rate of the each UE, and
wherein the calculating the first metrics comprises:
receiving channel information for the each UE;
calculating an instantaneous transmission rate of the each UE based on the received channel information; and
calculating the first metric of the UE based on the calculated instantaneous transmission rate and the average transmission rate of the UE and a fairness factor.

11. The method according to claim 10, wherein the updating of the transmission rate information for the each UE comprises updating the average transmission rate of the UE using the instantaneous transmission rate of the UE.

12. The method according to claim 11, wherein the updating the transmission rate information for the each UE comprises decreasing the average transmission rate of the each UE by a decrement based on the average transmission rate of the UE and an update coefficient and additionally increasing the average transmission rate of the frequency resource-allocated UE by an increment based on the instantaneous transmission rate of each UE and the update coefficient.

13. The method according to claim 12, wherein the updated average transmission rate of the each UE is expressed as Equation 4, $$R_s(t+1) = \begin{cases} (1-\beta)R_s(t) + \beta r_{s(t)} & \text{if } s = s^*(t) \\ (1-\beta)R_s(t) & \text{if } s \neq s^*(t) \end{cases} \text{ for } \forall s \in S$$  [Equation 4]

where $R_s(t+1)$ is the updated average transmission rate of the each UE, $R_s(t)$ is the average transmission rate of the each UE before the updating, $\beta$ is the update coefficient satisfying $0 < \beta \ll 1$, and $S^*(t)$ is the frequency resource-allocated UE.

14. The method according to claim 13, wherein the calculated first metrics are expressed as Equation 5, $$SM1 = U'_s(R_s(t))r_s(t)$$  [Equation 5]

where SM1 denotes the first scheduling metrics (Scheduling Metric 1) and $U'_s(R_s(t))$ is a utility function of $R_s(t)$, calculated by $$U'_s(R_s) = \begin{cases} \dfrac{R_s^{1-\alpha}}{1-\alpha} & \text{if } \alpha \neq 1 \\ \log(R_s) & \text{if } \alpha = 1 \end{cases}$$

where $\alpha$ is a parameter reflecting transmission rate and fairness.

15. A Base Station (BS) for allocating frequency resources to User Equipments (UEs) in a wireless communication system, the BS comprising:
a processor; and
a wireless communication module configured to transmit and receive wireless signals to and from the outside of the BS under control of the processor,
wherein the processor is configured to:
calculate first metrics using transmission rate information for each UE,
calculate second metrics using proportion information for each group to Which the each UE belongs,
determine a UE to which frequency resources are to be allocated based on the calculated first and second metrics, allocate frequency resources to the determined UE, and
update the transmission rate information for the each UE and the proportion information for the each group,
wherein the information for the each group includes a reference proportion for the each group and a resource allocation proportion of the each group, and
wherein the processor is configured to calculate the resource allocation proportion of the each group based on the reference ratio of the group and whether the UE to which frequency resources are allocated belongs to a group.

16. The BS according to claim 15, wherein the reference proportion of the each group is calculated using a weight assigned to the each group calculated based on a time proportion which is set for the each group.

17. The BS according to claim 16, wherein the processor is configured to select a UE having a highest sum of a first metric and a second metric as a UE to which frequency resources are to be allocated and update the proportion information for the each group by decreasing second metrics for UEs of a group to which the frequency resource-allocated UE belongs.

18. The BS according to claim 15, wherein the first metrics are alpha-Proportional Fairness ($\alpha$-PF) scheduling metrics based on an instantaneous transmission rate and average transmission rate of the each UE.

* * * * *